United States Patent
Mauro

(12) 
(10) Patent No.: US 6,345,793 B1
(45) Date of Patent: Feb. 12, 2002

(54) FLEXIBLE ROTATABLE HANDLE FOR TRANSMITTING TENSION, COMPRESSION AND TORQUE FORCES

(76) Inventor: Carl Mauro, 42 Powhatan La., Putnam Valley, NY (US) 10579

( * ) Notice: Subject to any disclaimer, the term of this patent is extended or adjusted under 35 U.S.C. 154(b) by 0 days.

(21) Appl. No.: 09/573,409

(22) Filed: May 18, 2000

(51) Int. Cl.[7] ............................................... F16M 13/00
(52) U.S. Cl. ...................................... 248/160; 248/104
(58) Field of Search ............................... 248/160, 104, 248/103, 102

(56) References Cited

U.S. PATENT DOCUMENTS

| | | | | |
|---|---|---|---|---|
| 1,250,064 A | * | 12/1917 | Whims ........................ | 40/608 |
| 2,510,198 A | * | 6/1950 | Tesmer .................. | 248/229.25 |
| 3,096,962 A | * | 7/1963 | Meijs ....................... | 248/276.1 |
| 3,203,285 A | * | 8/1965 | Schmidt .................... | 81/177.6 |
| 3,399,584 A | * | 9/1968 | Lewicki ..................... | 81/177.6 |
| 3,933,015 A | | 1/1976 | Balicki ........................... | 70/49 |
| 4,692,957 A | | 9/1987 | Kovacs ....................... | 15/104.3 |
| 4,949,927 A | | 8/1990 | Madocks et al. ........... | 248/276 |
| 5,174,164 A | | 12/1992 | Wilhelm .................... | 73/866.5 |
| 5,284,130 A | * | 2/1994 | Ratliff ........................ | 600/229 |
| 5,348,259 A | | 9/1994 | Blanco et al. .............. | 248/276 |
| 5,447,149 A | * | 9/1995 | Kikawada et al. .......... | 600/229 |
| 5,572,913 A | * | 11/1996 | Nasiell ...................... | 81/177.6 |
| 5,899,425 A | * | 5/1999 | Corey, Jr. et al. ......... | 248/276.1 |
| 5,943,936 A | | 8/1999 | Deliman et al. ............... | 90/115 |

\* cited by examiner

*Primary Examiner*—Ramon O. Ramirez
*Assistant Examiner*—Holly Sy
(74) *Attorney, Agent, or Firm*—Richard L. Miller

(57) ABSTRACT

A flexible rotatable device for transmitting tension, compression, and torque that includes a cable, a plurality of links that are threaded on the cable, a worked end, and a working end. The worked end includes a handle that has a throughbore that is generally circular in lateral cross section, except for a portion thereof that is square in lateral cross section, a sleeve that is square in lateral cross section and partially fills, while preventing relative rotation to, but allowing axial movement in, the portion of the throughbore in the handle, a threaded rod that extends from the sleeve, freely through and out of the throughbore in the handle, while one end of the cable extends axially and freely through the handle, freely through the throughbore in the handle, and fixedly in the sleeve, and a wing nut that threadably engages the threaded rod, and when tightened, causes the sleeve to slide rearwardly in the portion of the throughbore in the handle and increase tension on the cable, and when loosened, causes the sleeve to slide forwardly in the portion of the throughbore in the handle and decrease tension on the cable so as to vary stiffness and amount of bending of the flexible rotatable device creating a structural member which is tailored to load requirements of a specific application.

16 Claims, 1 Drawing Sheet

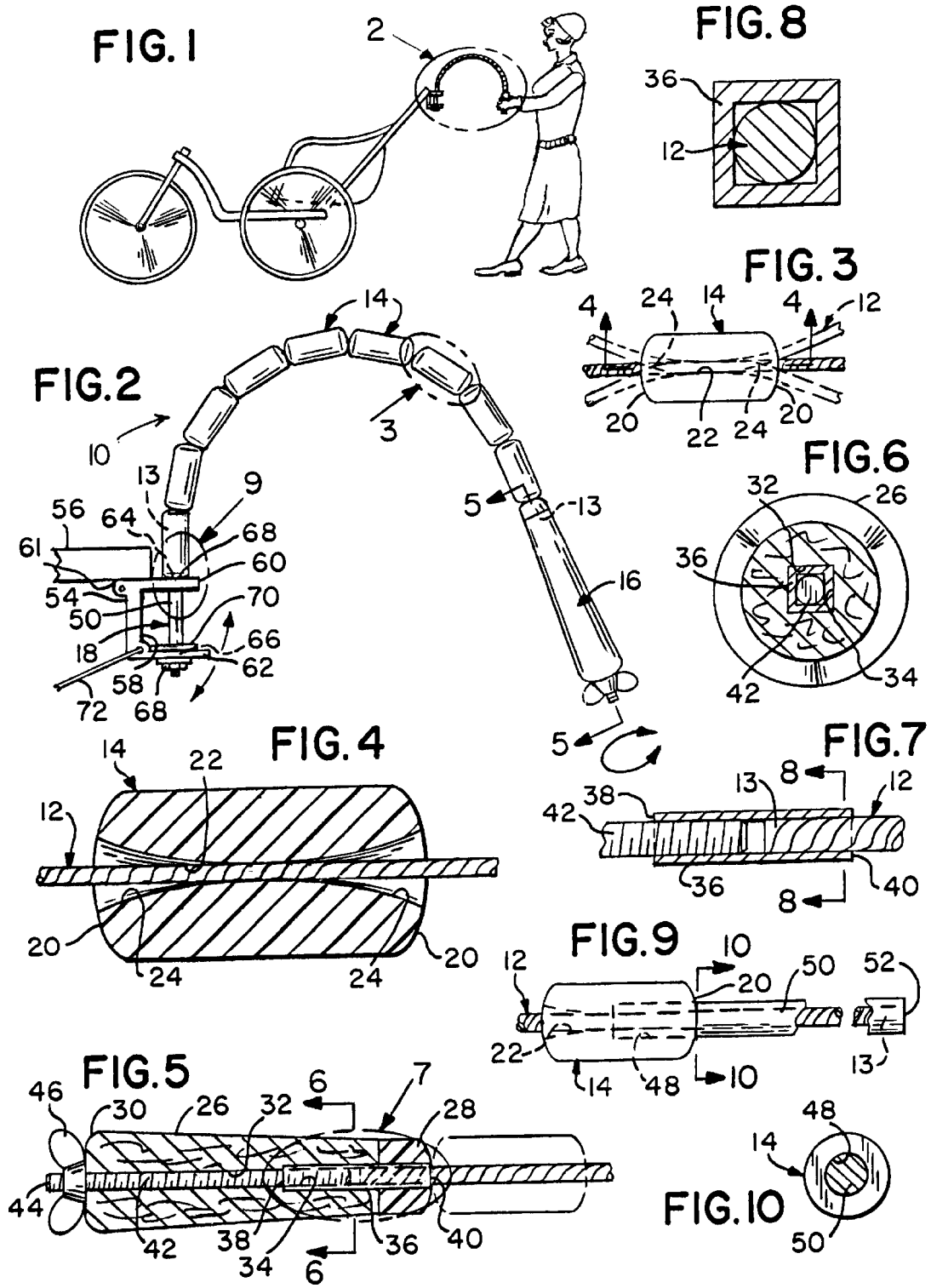

FLEXIBLE ROTATABLE HANDLE FOR TRANSMITTING TENSION, COMPRESSION AND TORQUE FORCES

BACKGROUND OF THE INVENTION

1. Field of the Invention

The present invention relates to a flexible rotatable device. More particularly, the present invention relates to a flexible rotatable device for transmitting tension, compression, and torque.

2. Description of the Prior Art

Numerous innovations for flexible columns have been provided in the prior art that will be described. Even though these innovations may be suitable for the specific individual purposes to which they address, however, they differ from the present invention.

A FIRST EXAMPLE, U.S. Pat. No. 3,933,015 to Balicki teaches an armored cable-type lock assembly embodying an armored cable consisting of a length of stranded steel cable on which there are threaded in bead-like fashion armor pieces in the form of alternately arranged ball members and socket members. A fixed terminal lock housing at the proximate end of the cable is provided with a transverse bore through which the distal end of the cable may be passed so that the housing functions as an overlap slip joint and causes the cable to form a closed retaining loop when the distal end of the cable is in the bore, the size of such loop being regulated by pulling or pushing the cable through the housing. A key-operated cylinder lock which is associated with the housing has a locking bolt which, when projected into its locked position, engages the opposed ends of a pair of adjacent socket members and forces them downwardly against the bottom wall of the bore, the latter being recessed in wide angle V-fashion so that the captured or bolt-engaged part of the armored cable develops a kink within the bore and is thus locked against endwise sliding through the bore. A fitting at the distal end of the armored cable is in the form of a thimble having a recessed inner end that mates with a half-ball which is integral with a special terminal armor piece. Both terminal arrangements are such that the possibility of hacksaw or abrasive attempts to penetrate the armor is inhibited.

A SECOND EXAMPLE, U.S. Pat. No. 4,692,957 to Kovacs teaches a plumbers snake having a weighted end and jointed members attached to a flexible shaft at the leading end thereof for removing or clearing obstructions in pipes or conduits. The weighted end and jointed members are arranged so as to facilitate negotiating any sharp bends disposed in the pipe by the jointed members being hinged in different planes. Included is a hand grip which is slidably adjusted at the outer end of the snake, which, when squeezed, is frictionally secured to the snake, to provide for a greater longitudinal force being applied to the snake during an insertion or unclogging operation.

A THIRD EXAMPLE, U.S. Pat. No. 4,949,927 to Madocks et al. teaches a method and apparatus for incrementally varying the frictional forces along an articulable column having successive joints formed of alternate ball and socket members. Friction is varied by varying the contact angle between said ball and socket members along the length of the column and by supplying a compressive force to said joints via a tensioned means throughout the column. The effect of varying the frictional forces along the column is to vary the stiffness of individual column joints creating a structural member which can be tailored to the load requirements of a specific application.

A FOURTH EXAMPLE, U.S. Pat. No. 5,174,164 to Wilheim teaches a flexible cable for carrying an inspection probe along the inside surface of a tube, such as a nuclear steam generator tube, to inspect the tube for anomalies and damage. The cable includes a core member having the inspection probe connected thereto and a plurality of adjacent interconnecting beads surrounding and disposed along the exterior of the core member. Each pair of adjacent beads defines a ball and socket joint for allowing the cable to flex without seizing or doubling-back on itself as the cable is moved in the tube so that the exact location of a tube anomaly can be precisely determined by measuring the length of the cable inserted into the tube.

A FIFTH EXAMPLE, U.S. Pat. No. 5,348,259 to Bianco et al. teaches a flexible, articulable column having a central cable tensioning member with a series of ball and socket members strung on the cable forming articulable joints. Each socket member has at least one conical opening with internal teeth engagable with a ball which is made of an elastomeric polymer. When the cable is tensioned, the sockets move toward each other and the balls are indented by the teeth of the socket. The column thus becomes rigid. Releasing the tension returns the column to the flexible state.

A SIXTH EXAMPLE, U.S. Pat. No. 5,943,936 to Deliman et al. teaches wheeled luggage cases that include at least two wheels and a handle with which to roll the luggage on these wheels. Most prior art wheel handles require the user to use considerable force to balance the case on these two wheels, either when the case is carrying auxiliary cases or when otherwise fully loaded. The disclosed luggage case has a wheel handle which extends out of and along one side of the case on an arm, and a handle grip mounted on this arm in a way that tips the luggage case forward to better balance over the wheels when carrying varying loads. The wheel handle arm also includes a mechanism that supports the handle grip at different heights to further optimize this load balancing function.

It is apparent that numerous innovations for flexible columns have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a flexible rotatable device for transmitting tension, compression, and torque that avoids the disadvantages of the prior art.

ANOTHER OBJECT of the present invention is to provide a flexible rotatable device for transmitting tension, compression, and torque that is simple and inexpensive to manufacture.

STILL ANOTHER OBJECT of the present invention is to provide a flexible rotatable device for transmitting tension, compression, and torque that is simple to use.

BRIEFLY STATED, YET ANOTHER OBJECT of the present invention is to provide a flexible rotatable device for transmitting tension, compression, and torque that includes a cable, a plurality of links that are threaded on the cable, a worked end, and a working end. The worked end includes a handle that has a throughbore that is generally circular in lateral cross section, except for a portion thereof that is square in lateral cross, section, a sleeve that is square in lateral cross section and partially fills, while preventing relative rotation to, but allowing axial movement in, the portion of the throughbore in the handle, a threaded rod that extends from the sleeve, freely through and out of the throughbore in the handle, while one end of the cable extends axially and freely through the handle, freely through the throughbore in the handle, and fixedly in the sleeve, and a wing nut that threadably engages the threaded rod, and when tightened, causes the sleeve to slide rearwardly in the portion of the throughbore in the handle and increase tension on the cable, and when loosened, causes the sleeve to slide forwardly in the portion of the throughbore in the handle and decrease tension on the cable so as to vary stiffness and amount of bending of the flexible rotatable device creating a structural member which is tailored to load requirements of a specific application.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 s a diagrammatic side elevational view of the present invention in use;

FIG. 2 is an enlarged diagrammatic side elevational view of the present invention;

FIG. 3 is an enlarged diagrammatic side elevational view of the area generally enclosed by the dotted curve identified by arrow 3 in FIG. 2 of a link of the present invention;

FIG. 4 is a enlarged diagrammatic cross sectional view taken on line 4—4 in FIG. 3;

FIG. 5 is an enlarged diagrammatic cross sectional view taken on line 5—5 in FIG. 2 of the handle of the present invention;

FIG. 6 is an enlarged diagrammatic cross sectional view taken on line 6—6 in FIG. 5;

FIG. 7 is an enlarged diagrammatic cross sectional view of the area generally enclosed in the dotted curve identified by arrow 7 in FIG. 5;

FIG. 8 is an enlarged diagrammatic cross sectional view taken on line 8—8 in FIG. 7;

FIG. 9 is an enlarged diagrammatic side elevational view of the area generally enclosed by the dotted curve identified by arrow 9 in FIG. 2 of the working end of the present invention; and FIG. 10 is an enlarged diagrammatic cross sectional view taken on line 10—10 in FIG. 9.

LIST OF REFERENCE NUMERALS UTILIZED IN THE DRAWING 10 flexible rotatable device of present invention for transmitting tension, compression, and torque
12 cable
13 pair of ends of cable 12
14 plurality of links
16 worked end
18 working end
20 pair of ends of each link of plurality of links 14
22 throughbore through each link of plurality of links 14
24 flared ends of throughbore 22 through each link of plurality of links 14
26 handle of worked end 16 for embracing by user
28 proximal end of handle 26 of worked end 16
30 distal end of handle 26 of worked end 16
32 throughbore through handle 26 of worked end 16
34 portion of throughbore 32 through handle 26 of worked end 16
36 sleeve of handle 26 of worked end 16
38 proximal end of sleeve 36 of handle 26 of worked end 16
40 distal end of sleeve 36 of handle 26 of worked end 16
42 threaded rod of handle 26 of worked end 16
44 exposed end of threaded rod 42 of handle 26 of worked end 16
46 wing nut of handle 26 of worked end 16
48 portion of throughbore 22 in terminal link 14 of working end 18
50 tube of working end 18
52 exposed end of tube 50 of working end 18
54 bracket of working end 18 for pivotally attaching to working device
56 working device
58 web of bracket 54 of working end 18
60 proximal flange of bracket 54 of working end 18
61 intersection point of bracket 54 of working end 18 for pivotally attaching to working device 56 and forming fulcrum point for allowing pivotal movement during use
62 distal flange of bracket 54 of working end 18
64 throughbore through proximal flange 60 of bracket 54 of working end 18
66 throughbore through distal flange 62 of bracket 54 of working end 18
68 pair of bearings of bracket 54 of working end 18
70 pulley of bracket 54 of working end 18
72 working cable of bracket 54 of working end 18

DETAILED DESCRIPTION OF THE PREFERRED EMBODIMENT

Referring now to the figures, in which like numerals indicate like parts, and particularly to FIG. 1, the flexible rotatable device of the present invention is shown generally at 10 for transmitting tension, compression, and torque.

The general configuration of the flexible rotatable device 10 can best be seen in FIG. 2, and as such, will be discussed with reference thereto.

The flexible rotatable device 10 comprises a cable 12 that is flexible and has a pair of ends 13, a plurality of links 14 that are threaded on the cable 12, in end-to-end relationship, a worked end 16 that is operatively connected to one end 13 of the cable 12, and a working end 18 that is operatively connected to the other end 13 of the cable 12.

The specific configuration of the plurality of links 14 and their interaction with the cable 12 can best be seen in FIGS. 3 and 4, and as such, will be discussed with reference thereto.

Each link 14 is made of hard plastic.

Each link 14 is cylindrically-shaped and has a pair of ends 20 that are opposing.

The pair of ends 20 of each link 14 are convexed in a somewhat hemispherical shape so as to allow the end 20 of one link 14 to roll on the end 20 of a directly adjacent link 14.

Each link 14 further has a throughbore 22 that extends axially therethrough, from one end 20 thereof, to the other end 20 thereof, and which freely receives the cable 12 therethrough.

The throughbore 22 in each link 14 flares outwardly at the pair of ends 20 of an associated link 14 so as to form flared ends 24 that allow the cable 12 to assume an arcuate shape in the associated link 14 when the flexible rotatable device 10 is bent.

The specific configuration of the worked end 16 can best be seen in FIGS. 5–8, and as such, will be discussed with reference thereto.

The worked end 16 comprises a handle 26 that is operatively connected to the one end 13 of the cable 12 for embracing by a user.

The handle 26 is slender, elongated, extends axially from the one end 13 of the cable 12, and has a proximal end 28 and a distal end 30.

The handle 26 further has a throughbore 32 that extends axially therethrough, from the proximal end 28 thereof, to the distal end 30 thereof.

The throughbore 32 in the handle 26 is generally circular in lateral cross section, except for a portion 34 thereof that is square in lateral cross section.

The portion 34 of the throughbore 32 in the handle 26 extends axially from the proximal end 28 of the handle 26, to approximately midway between the proximal end 28 of the handle 26 and the distal end 30 of the handle 26.

The handle 26 further has a sleeve 36 that is square in lateral cross section and partially fills, while preventing relative rotation to, but allowing axial movement in, the portion 34 of the throughbore 32 in the handle 26, and has a proximal end 38 and a distal end 40.

The handle 26 further has a threaded rod 42 that extends axially, from fixedly in the distal end 38 of, and approximately midway in, the sleeve 36, freely through the throughbore 32 in the handle 26, and freely out through, and past, the distal end 30 of the handle 26 so as to from an exposed end 44, while the one end 13 of the cable 12 extends axially and freely through the proximal end 28 of the handle 26, freely through the portion 34 the throughbore 32 in the handle 26, and fixedly in the proximal end 40 of, and approximately midway in, the sleeve 36.

The handle 26 further has a wing nut 46 that threadably engages the exposed end 44 of the threaded rod 42, and when tightened, causes the sleeve 36 to slide rearwardly in the portion 34 of the throughbore 32 in the handle 26 and increase tension on the cable 12, and when loosened, causes the sleeve 36 to slide forwardly in the portion 34 of the throughbore 32 in the handle 26 and decrease tension on the cable 12 so as to vary stiffness and amount of bending of the flexible rotatable device 10 creating a structural member which is tailored to load requirements of a specific application.

The specific configuration of the working end 18 can best be seen in FIGS. 2, 9, and 10, and as such, will be discussed with reference thereto.

The working end 18 comprises the throughbore 22 in a terminal link 14 having a portion 48 thereof that is cylindrically-shaped, wider than, and coaxial with, the throughbore 22 in the terminal link 14.

The portion 48 of the throughbore 22 in the terminal link 14 extends from a far end 20 of the terminal link 14, to approximately midway between the pair of ends 20 of the terminal link 14.

The working end 18 further comprises a tube 50 that is fixed in, and extends axially from, the portion 48 of the throughbore 22 in the terminal link 14, past the far end 20 of the terminal link 14, to a exposed end 52 that is closed, and captures the other end 13 of the cable 12 therein.

The tube 50 is pressure fitted in the portion 48 of the throughbore 22 in the terminal link 14.

The tube 50 is epoxied in the portion 48 of the throughbore 22 the terminal link 14.

The working end 18 further comprises a bracket 54 for pivotally attaching to a working device 56.

The bracket 54 is substantially C-shaped and is formed by a web 58, a proximal flange 60 that intersects the web 58 thereof at an intersects point 61 for pivotally attaching to the working device 56 and forming a fulcrum point for allowing pivotal movement during use, and a distal flange 62.

The proximal flange 60 of the bracket 54 has a throughbore 64 therethrough, and the distal flange 62 of the bracket 54 has a throughbore 66 therethrough that is in alignment with the throughbore 64 in the proximal flange 60 of the bracket 54.

The bracket 54 further has a pair of bearings 68 that are disposed in the throughbore 64 in the proximal flange 60 of the bracket 54 and the throughbore 66 in the distal flange 62 of the bracket 54, respectively.

The tube 50 passes rotatably through the bearing 68 in the throughbore 64 in the proximal flange 60 of the bracket 54 and then rotatably through, and past, the bearing 68 in the throughbore 66 in the distal flange 62 of the bracket 54.

The bracket 54 further has a pulley 70 that is attached to the tube 50 for rotation therewith, and which is disposed directly above the distal flange 62 of the bracket 54.

The bracket 54 further has a working cable 72 that extends freely therethrough and which is windable around the pulley 70.

It will be understood that each of the elements described above, or two or more together, may also find a useful application in other types of constructions differing from the types described above.

While the invention has been illustrated and described as embodied in a flexible rotatable cable for transmitting tensiey, compression, and torque, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A flexible rotatable device for transmitting tension, compression, and torque, comprising:
   a cable being flexible and having a pair of ends;
   a plurality of links being threaded on said cable, in end-to-end relationship;
   a worked end operatively connected to one of said pair of ends of said cable; and
   a working end operatively connected to another one of said pair of end of said cable, wherein said worked end comprises a handle that is operatively connected to said one end pair of ends of said cable for embracing by a user, wherein said handle is slender, elongated, extends axially from said one of said pair of ends of said cable, and has:
   a proximal end; and
   a distal end, wherein said handle further has a throughbore that extends axially therethrough, from said proximal end thereof, to said distal end thereof, wherein said throughbore in said handle is generally circular in lateral cross section, except a portion thereof that is square in lateral section.

2. The device as defined in claim 1, wherein said portion of said throughbore in said handle extends axially from said proximal end of said handle, to approximately midway between said proximal end of said handle and said distal end of said handle.

3. The device as defined in claim 1, wherein said handle further has a sleeve that is square in lateral cross section and partially fills, while preventing relative rotation to, but allowing axial movement in, said portion of said throughbore in said handle, and has:

a) a proximal end; and b) a distal end.

4. The device as defined in claim 3, wherein said further has a threaded rod that extends axially from fixedly distal end of, and approximately midway in, said sleeve, through said throughbore in said handle, and freely out throughbore past, said distal end of said handle so as to from an exposed while said one of said pair of ends of said cable extends and freely through said proximal end of said handle, freely said portion of said throughbore in said handle, and fixedly proximal end of, and approximately midway in, said sleeve.

5. The device as defined in claim 4, wherein said handle further has a wing nut that threadably engages said exposed end of said threaded rod, and when tightened, causes said sleeve to slide rearwardly in said portion of said throughbore in said handle and increase tension on said cable, and when loosened, causes said sleeve to slide forwardly in said portion of said throughbore in said handle and decrease tension on said cable so as to vary stiffness and amount of bending of said flexible rotatable device creating a structural member which is tailored to load requirements of a specific application.

6. A flexible rotatable device for transmitting tension, compression, and torque, comprising:

a cable being flexible and having a pair of ends;

a plurality of links being threaded on said cable, in end-to-end relationship;

a worked end operatively connected to one of said pair of ends of said cable; and a working end operatively connected to another one of said pair of end of said cable, wherein each of said links is cylindrically-shaped and has a pair of ends that are opposing, wherein each of said links further has a throughbore that extends axially therethrough said pair of ends and which freely receives said cable therethrough, wherein said working end comprises said throughbore in a terminal link of said links having a portion thereof that is cylindrically-shaped, wider than, and coaxial with, said throughbore in said terminal link, wherein said portion of said throughbore in said terminal link extends from a far end of said terminal link, to approximately midway between said pair of ends of said terminal link, wherein said working end further comprise a tube that is fixed in, and extends axially from, said portion of said throughbore in said terminal link, past said far end of said terminal link, to an exposed end that is closed, and which captures said another one of said pair of ends of said cable therein.

7. The device as defined in claim 3, wherein said handle further has a threaded rod that extends axially from fixedly in said distal end of, and approximately midway in, said sleeve, freely through said throughbore in said handle, and freely out through, and past, said distal end of said handleso as to from an exposed end, while said one of said pair of ends of said cable extends axially and freely through said proximal end of said handle, freely through said portion of said throughbore in sais handle, and fixedly in said proximal end of, and approximatly midway in, said sleeve.

8. The device as defined in claim 6, wherein said tube is epoxied in said portion of said throughbore in said terminal link.

9. The device as defined in claim 6, wherein said throughbore in each of said links flares outwardly at said pair of ends so as to form flared ends that allow said cable to assume arcuate shape in each of said links when said flexible rotatable device is bent.

10. The device as defined in claim 6, wherein said working end further comprises a bracket for pivotally attaching to a working device.

11. The device as defined in claim 10, wherein said bracket is substantially C-shaped and is formed by:

a) a web;

b) a proximal flange that intersects said web thereof at an intersection point for pivotally attaching to the working device and forming a fulcrum point for allowing pivotal movement during use; and c) a distal flange.

12. The device as defined in claim 11, wherein said proximal flange of said bracket has a throughbore therethrough, and said distal flange of said bracket has a throughbore therethrough that is in alignment with said throughbore in said proximal flange of said bracket.

13. The device as defined in claim 12, wherein said bracket further has a pair of bearings one each that are disposed in said throughbore in said proximal flange of said bracket and said throughbore in said distal flange of said bracket, respectively.

14. The device as defined in claim 13, wherein said tube passes rotatably through said bearing in said throughbore in said proximal flange of said bracket and then rotatably through, and past, said bearing in said throughbore in said distal flange of said bracket.

15. The device as defined in claim 7, wherein said bracket further has a pulley that is attached to said tube for rotation therewith, and is disposed directly above said distal flange of said bracket.

16. The device as defined in claim 15, wherein said bracket further has a working cable that extends freely therethrough and is windable around said pulley.

* * * * *